United States Patent
Peng et al.

(10) Patent No.: US 9,430,556 B2
(45) Date of Patent: Aug. 30, 2016

(54) SYSTEM FOR SELF-DISTINGUISHABLE IDENTIFIER AND GENERATION

(71) Applicants: Yu Jun Peng, Shanghai (CN); Li Cheng, Shanghai (CN)

(72) Inventors: Yu Jun Peng, Shanghai (CN); Li Cheng, Shanghai (CN)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 14/135,551

(22) Filed: Dec. 19, 2013

(65) Prior Publication Data

US 2015/0178377 A1    Jun. 25, 2015

(51) Int. Cl.
*G06F 17/30*    (2006.01)
*G06F 17/27*    (2006.01)

(52) U.S. Cl.
CPC ..... *G06F 17/30613* (2013.01); *G06F 17/2735* (2013.01)

(58) Field of Classification Search
USPC .......................................... 707/741, 803–804
See application file for complete search history.

(56) References Cited

U.S. PATENT DOCUMENTS

| | | | |
|---|---|---|---|
| 5,950,190 A * | 9/1999 | Yeager | G06F 17/30572 |
| 7,418,475 B2 | 8/2008 | Stewart et al. | |
| 7,603,300 B2 | 10/2009 | Haffner et al. | |
| 7,711,607 B2 | 5/2010 | Agassi et al. | |
| 7,900,151 B2 | 3/2011 | Gebhard et al. | |
| 7,949,666 B2 * | 5/2011 | Wolff | G06F 17/30165 380/281 |
| 8,117,093 B2 | 2/2012 | Vo et al. | |
| 8,412,549 B2 | 4/2013 | Graeber et al. | |
| 8,413,165 B2 | 4/2013 | Lindemann et al. | |
| 8,447,025 B2 | 5/2013 | Shaffer et al. | |
| 8,577,837 B2 * | 11/2013 | Wintel | G06F 17/30575 707/610 |
| 8,589,213 B2 | 11/2013 | Loveday et al. | |
| 8,626,543 B2 | 1/2014 | Liu et al. | |
| 8,626,730 B2 | 1/2014 | Enenkiel | |
| 8,661,103 B2 | 2/2014 | Mehta et al. | |
| 2005/0021757 A1 * | 1/2005 | Helliwell | H04L 29/1232 709/226 |
| 2007/0226535 A1 * | 9/2007 | Gokhale | G06F 11/1435 714/6.12 |
| 2008/0133187 A1 * | 6/2008 | Smith | G06F 17/50 703/2 |
| 2008/0281855 A1 | 11/2008 | Lange et al. | |
| 2009/0024667 A1 * | 1/2009 | Noda | G06F 17/243 |
| 2009/0043864 A1 * | 2/2009 | Shetty | H04L 12/66 709/217 |
| 2009/0187979 A1 * | 7/2009 | Sever | H04L 29/12122 726/5 |
| 2009/0276396 A1 * | 11/2009 | Gorman | G06F 17/2785 |
| 2010/0211379 A1 * | 8/2010 | Gorman | G06F 17/2785 704/9 |
| 2014/0047319 A1 | 2/2014 | Eberlein | |
| 2014/0068559 A1 * | 3/2014 | Szocs | G06F 8/38 717/120 |
| 2014/0207834 A1 * | 7/2014 | Cherian | G06F 3/06 707/827 |
| 2014/0244687 A1 * | 8/2014 | Shmueli | G06F 17/30587 707/780 |

* cited by examiner

*Primary Examiner* — Hanh Thai
(74) *Attorney, Agent, or Firm* — Horizon IP Pte. Ltd.

(57) ABSTRACT

Disclosed herein is a framework for generating and providing self-distinguishable identifiers as to users. In accordance with one aspect, an entry is retrieved from an object, wherein the entry includes one or more fields. The one or more fields may be concatenated to create a concatenated string. The framework may then determine if the concatenated string is unique from other concatenated strings in a listing of the object. If the concatenated string is determined to be not unique, a unique sequence identifier may be added to the concatenated string.

20 Claims, 4 Drawing Sheets

| ID 102 | Title 104 | First Name 106 | Last Name 108 | E-Mail 110 |
|---|---|---|---|---|
| 1 | | Kevin | | |
| 2 | Mr. | Kevin | | |
| 3 | | | Peng | |
| 4 | | | | Kevin.peng@sap.com |
| N | | | | |

Fig. 1

| ID 102 | Title 104 | First Name 106 | Last Name 108 | E-Mail 110 |
|---|---|---|---|---|
| 1 | | Kevin | | |
| 2 | Mr. | Kevin | | |
| 3 | | | Peng | |
| 4 | | | | Kevin.peng@sap.com |
| 5 | | Kevin | Peng | |
| 6 | | Kevin | Peng | |

SYSTEM FOR SELF-DISTINGUISHABLE IDENTIFIER AND GENERATION

TECHNICAL FIELD

The present disclosure relates generally to generating unique self-distinguishable identifiers for users.

BACKGROUND

Identifiers may be used to distinguish users from one another in various implementations. For example, software applications may depend on unique identifiers to differentiate users from one another and/or to differentiate different instances of the same user. Users may include individuals, business entities, etc.

New identifiers are continuously needed and generated, and particularly by software applications. In certain instances, software applications and/or systems may ask users to enter information used to create an identifier. Particular fields may be considered mandatory, and need to be filled in order to create a record and generate an identifier. A user may not have the information to fill in such fields, or may not fill in the field for whatever reasons. Therefore, if a mandatory field is not filled in, an identifier may not be created, or a record created. Such fields may be designated as non-mandatory, or fields that need not be filled; however, this can lead to identifiers that are the same and situations where users are not differentiated from one another.

SUMMARY

Disclosed herein is a framework for generating and providing self-distinguishable identifiers as to users. In accordance with one aspect, an entry is retrieved from an object, wherein the entry includes one or more fields. The one or more fields may be concatenated to create a concatenated string. The framework may then determine if the concatenated string is unique from other concatenated strings in a listing of the object. If the concatenated string is determined to be not unique, a unique sequence identifier may be added to the concatenated string.

In accordance with another aspect, the framework initiates a dictionary. An entry is fetched from a table of the dictionary. The framework then places in order one or more fields of the entry, and concatenates the one or more fields of the entry to create a self-distinguishable identifier.

In accordance with yet another aspect, a system including an input and sub-system is provided. The input may receive one or more entries that are added to an object. The sub-system may concatenate fields of the one or more entries to generate self-distinguishable identifiers. The sub-system may further determine if the self-distinguishable identifiers are unique, and may add a sequence identifier if the self-distinguishable identifiers are not unique.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 illustrates an exemplary table used in accordance with the technology described herein;

FIG. 3 illustrates another exemplary table used in accordance with the technology described herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 2:
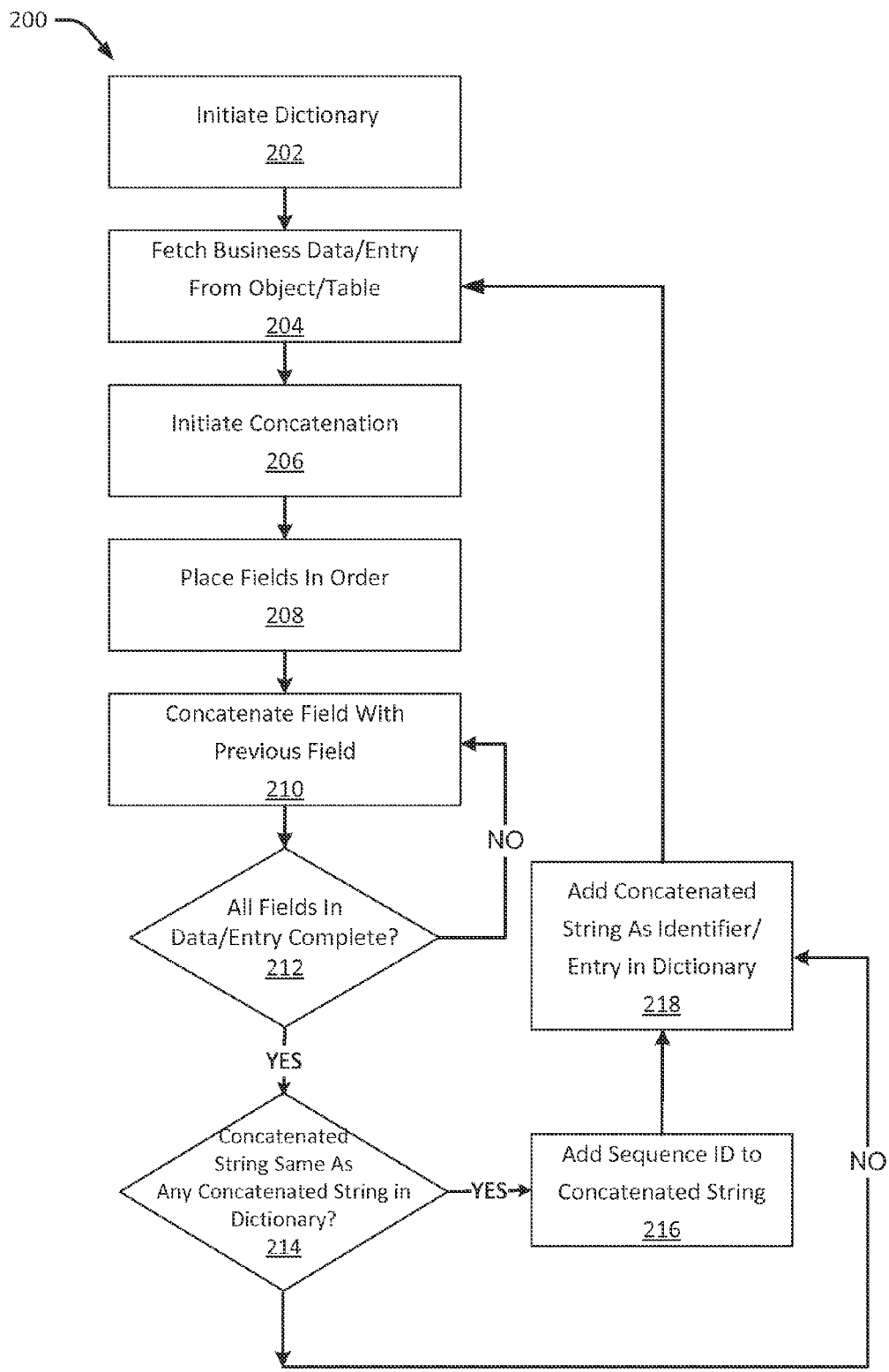
FIG. 2 illustrates an exemplary process used in accordance with the technology described herein.

Disclosed herein are technologies for generating and providing a self-distinguishable identifier, which is human readable, without mandatory fields to be filled in. Examples of users include individuals, business or corporate entities, etc. Self-distinguishable identifiers may be used by software applications to relate specific records and/or other data to particular users, or particular instances of the same users.

Using conventional approaches, identifiers are created by having an individual (e.g., user) manually enter information or data, or importing a data file from another device or record file. Data for "mandatory" fields are required to be entered; however, such information or data to be entered is not available or is simply omitted. It is desirable to allow a user or data file to enter the information that is available, and not constrained with mandatory fields.

In many instances, an identifier is not easily readable by a person (e.g., end user). In other words identifiers may be machine readable, however they are not human readable. It is further desirable to provide human users (e.g., end user) an identifier that is easily recognizable and distinguishable.

In accordance with the technology described herein, a user through an interface, such as a graphical user interface of a software application enter data/information, and an object directed by the software application generates a unique self-distinguishable identifier. It is to be understood that other methods may be used to enter data/information, such as for example, the use of data files from one device to another device running the software application.

The software application may be a standalone business system or part of a larger system. The process(es) that generates and provides self-distinguishable identifier may be considered as an object of the software application. The object may be implemented as a table that generates and lists a number of self-distinguishable identifiers. Furthermore, the self-distinguishable identifier are created to be human readable.

An example of an object structure which may be implemented as part of a business system, includes the following fields:

1) ID, which is a persistent identifier that may be unreadable by human. The value may be sequential, such as 1, 2, 3, etc.
2) Title, which may be the contact/user's title, such as "Mr.", "Ms.", "Miss", "Dr.", etc.
3) First Name, which may be the contact/user's first name.
4) Last Name, which may be the contact/user's last name.
5) E-Mail, which may be the contact/user's email address.

It is to be understood that this is an example of fields that may be included in an object or table, and that other fields may be included, or certain fields omitted in other embodiments.

For each identifier entry, all fields may be empty; however, the ID field should have a value. For each identifier entry, the ID field may be generated in sequence (e.g. numerical sequence). In order to determine the last entry, the last identifier entry in the object/table may contain a value or have at least one of the fields include a value.

In certain implementations, when processed or used by a software application(s) or other computer process, the values of the fields, with the exception of the ID field, are not relied upon by the software application or process. In other words, only the ID field of each self-distinguishable identifier is used as a reference by the software application or process.

In certain implementations, the ID is only machine readable and cannot be read by a human user; however, provision is provided to allow human users to efficiently and easily identify records and identifiers. For example, human users may be presented with a drop down menu that presents a list of "contacts" from the self-distinguishable identifier object or table. In certain instances, a human user manually enters data to create or update an identifier (self-distinguishable identifier). Therefore, the human user needs to be able to accurately determine the correct or unique self-distinguishable identifier in order to correctly create the unique self-distinguishable identifier and/or update the record associated with the self-distinguishable identifier.

FIG. 1 shows an example object structure in the form of a table 100. The table 100 includes various fields. In this example, table 100 includes an "ID" field 102, a "Title" field 104, a "First Name" field 106, a "Last Name" field 108, and an "E-Mail" field 110. The object or table 100 may be populated with self-distinguishable identifiers as illustrated by rows or entries 112. Such self-distinguishable identifiers may be entered by a user or receive input from a data file as discussed above. Each entry 112 includes a unique ID field 102 value that is machine readable and distinguishes each entry from other entries (i.e., entries 112). The ID field 102 values may be generated automatically without user intervention. The ID field 102 values may also be generated sequentially (e.g., numerical order).

Table 100 is an example of an object that contains certain fields, and it is contemplated that additional and/or different fields may be provided in certain embodiments. Table 100 or an object can be considered to have the following fields: ID, which is unique for each entry or self-distinguishable identifier, and a number of other fields represented as $f_1$, $f_2$, $f_3$, ..., $f_n$.

The following pseudo code listing is an example of a process in which a self-distinguishable identifier may be generated.

```
Initiate the dictionary SD{ } which to contain <ID,
    concatenation, sequence>
loop2(index=0; index<count of record;index++) 'Fetch one
    business data (or record from table)
    initiate concatenation CONC = empty
    loop 1 (index'=0;  index'<count  of  non-empty
        fields,index'++) 'Get all non-empty fields
        orderly(f_1',f_2',f_3',...,f_n')
        CONC=CONC+f_index'   'concatenate   with
            separate char or space
        If CONC not equal to anyone of concatenation
            in SD, put the third <ID, CONC, 1> into
            SD, and go to loop2
        else If index'=m (means it's last field which has
            value), get the sequence S of last element
            in SD which has same concatenation, put
            <ID, CONC, S+1> into SD. And go to
            loop2
```

-continued

```
Go to loop1
Go to loop2
Combine concatenation and sequence in each element in
    dictionary SD as <ID, concatenation+sequence>
```

FIG. 2 illustrates an exemplary process 200 for implementing, at least in part, the technology described herein. In particular, process 200 depicts an onboarding flow that generates and provides self-distinguishable identifiers, as described in the pseudo code listed above. The process 200 may be performed by a computing device or devices. An example architecture of such a computer device is described below with reference to FIG. 4. In this particular example, the process 200 describes that certain acts are be performed at or by a user or a system.

At 202, a dictionary is initiated. The initiation may be performed by a user. The device or devices may be in receipt of a data file which initiates the dictionary. The dictionary may be a pre-existing dictionary or a newly created dictionary.

At 204, data or an entry from an object such as a table is fetched. The data or entry is a record that has been previously entered either by a user or received from a data file. The object or table has been sufficiently populated with such entries.

At 206, concatenation of the fields of the data string is initiated.

At 208, the fields of the data string are placed in order. The order of the fields may be predetermined. For example, the fields may be ordered based on the position they are at on the object or table, such as by column number.

At 210, a field is concatenated with a previous field or fields.

At 212, a determination is made if all the fields in the data string have been processed. If additional fields need to be looked at (i.e., processed), following the "NO" branch of 212, the step of 210 is performed. If all fields have been processed, then following the "YES" branch of 212, a determination is made at 214.

At 214, a determination is made whether the concatenated string is the same as any string (concatenated string) that is already in the dictionary. If the same concatenated string is found, then following the "YES" branch of 214, at 216, a unique sequence identifier ID is added to the concatenated string. If the same concatenated string is not found in the dictionary, then following the "NO" branch of 214, at 218 the concatenated string is added in the dictionary as a unique self-distinguishable identifier. In particular, the combination of the concatenated string and the sequence identifier or ID may be considered as self-distinguishable identifier.

In certain embodiments, to provide for better human readability, certain fields, such as fields in ($f_1$, $f_2$, $f_3$, ..., $f_n$), may be considered as concatenated if they appear in a non-empty field set. For example, in a "Contact" listing, the fields "First Name" and "Last Name" may be considered as concatenated.

FIG. 3 shows an example object structure in the form of a table 300. Table 3 includes "ID" field 102, "Title" field 104, "First Name" field 106, "Last Name" field 108, and "E-Mail" field 110. In this example, there are six entries 312-1, 312-2, 312-3, 312-4, 312-5, and 312-6. Considering that the fields "First Name" 106 and "Last Name" 108 are in concatenation, and applying the processes described above, the following self-distinguishable identifier are generated:

For entry 312-1, the self-distinguishable identifier is <1, Kevin 1>

For entry 312-2, the self-distinguishable identifier is <2, Kevin 2>, the sequence ID is added to differentiate from the previous self-distinguishable identifier of entry 312-1.

For entry 312-3, the self-distinguishable identifier is <3, Mr. Peng>, if the fields "First Name" 106 and "Last Name" 108 have value, they are considered as concatenated.

For entry 312-4, the self-distinguishable identifier is <4, Kevin.peng@sap.com>

For entry 312-5, the self-distinguishable identifier is <5, Kevin Peng 1>

For entry 312-6, the self-distinguishable identifier is <6, Kevin Peng 2>, the sequence ID is added to differentiate from the previous self-distinguishable identifier of entry 312-5.

In certain instances, such as presenting a "Contacts" list, to a user (human), the self-distinguishable identifier may be displayed as the following:

For entry 312-1, the self-distinguishable identifier is "Kevin 1".

For entry 312-2, the self-distinguishable identifier is "Kevin 2".

For entry 312-3, the self-distinguishable identifier is "Mr. Peng".

For entry 312-4, the self-distinguishable identifier is "Kevin.peng@sap.com".

For entry 312-5, the self-distinguishable identifier is "Kevin Peng 1".

For entry 312-6, the self-distinguishable identifier is "Kevin Peng 2".

Figure 4:
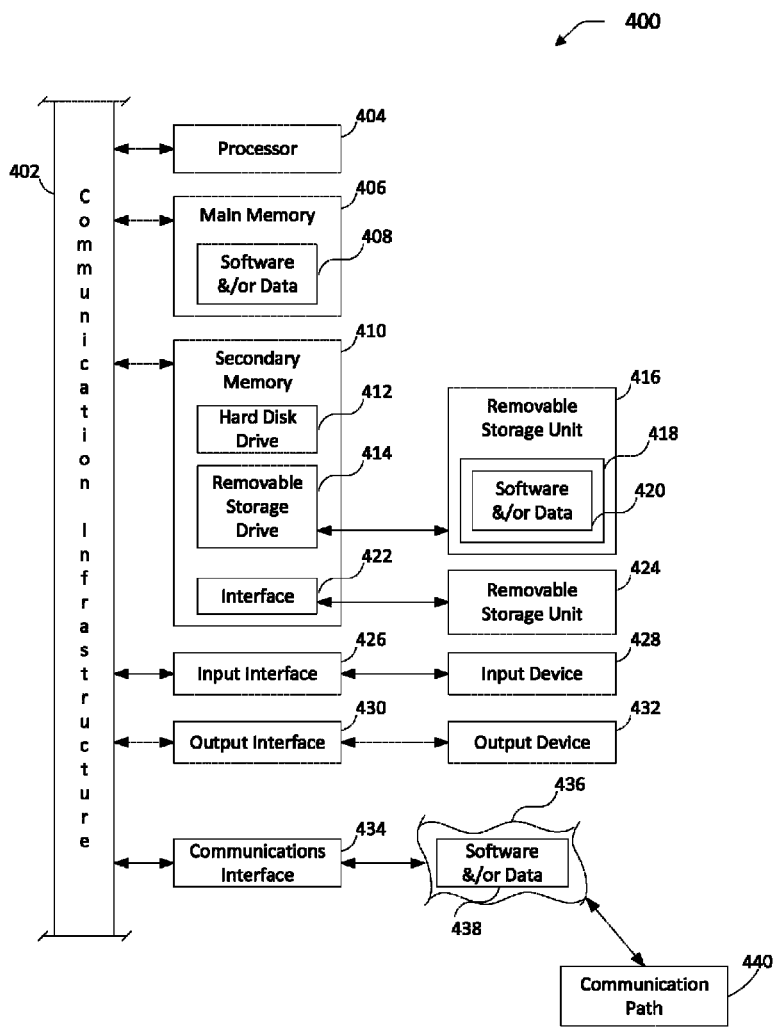
FIG. 4 illustrates an exemplary computing system to implement in accordance with the technologies described herein.

FIG. 4 illustrates an exemplary system 400 that may implement, at least in part, the technologies described herein. The computer system 400 includes one or more processors, such as processor 404. Processor 404 can be a special-purpose processor or a general-purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc. which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar means for allowing computer programs or other instructions to be loaded into computer system 400. Such means may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications interface 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g. Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method that generates a unique self-distinguishable identifier, the method comprising:
    retrieving, by a processor, an object having a plurality of entries, the object having an object structure which includes a sequence of fields for entries of the object, wherein an entry of the object includes one or more filled fields with values;
    processing the object to generate unique self-distinguishable identifiers from the entries of the object, wherein processing the object comprises,
        analyzing an entry of the object which includes,
            concatenating the filled fields of the object structure in sequence to create a concatenated identifier string of the entry being analyzed (analyzed entry),
            comparing the concatenated identifier string of the analyzed entry with a string dictionary stored in memory, the string dictionary containing dictionary entries of existing strings,
            storing the concatenated identifier string of the analyzed entry in the string dictionary only if the concatenated identifier string is a unique concatenated string which does not match any dictionary entry in the string dictionary, and
            adding a unique sequence identifier to the concatenated identifier string only if the concatenated identifier string is a non-unique concatenated string by matching a dictionary entry, wherein the concatenated string with the unique sequence identifier is not added to the string dictionary; and
    repeat analyzing an entry of the object until all entries in the object have been analyzed.

2. The method according to claim 1, wherein the object comprises a table containing the plurality of entries.

3. The method according to claim 1, wherein the entries of the object are entered by a user or from a data file.

4. The method according to claim 1, wherein the sequence of fields of an entry are non-mandatory and one or more fields can be left empty.

5. The method according to claim 1, wherein the concatenating includes filled fields that are considered as concatenated with one another.

6. The method according to claim 1, wherein the unique sequence identifier is a sequential identifier to the analyzed entry.

7. The method according to claim 1 further comprising initiating the string dictionary.

8. The method according to claim 1, wherein the unique self-distinguishable identifiers are human readable identifiers.

9. One or more computer-readable media storing processor-executable instructions that when executed cause one or more processors to perform operations that generate unique self-distinguishable identifiers, the operations comprising:
    retrieving, by a processor, an entry of an object having an object structure which includes a sequence of fields for entries of the object, wherein an entry of the object includes one or more filled fields with values; and
    processing the retrieved entry to generate a unique self-distinguishable identifier, wherein processing the retrieved entry comprises, concatenating the filled fields of the retrieved entry in sequence to create a concatenated identifier string of the retrieved entry, comparing the concatenated identifier string of the retrieved entry with a string dictionary stored in memory, the string dictionary containing dictionary entries of existing strings, storing the concatenated identifier string of the retrieved entry in the string dictionary only if the concatenated identifier string is a unique concatenated string which does not match any dictionary entry in the string dictionary, and adding a unique sequence identifier to the concatenated identifier string only if the concatenated identifier string is a non-unique concatenated string by matching a dictionary entry, wherein the concatenated string with the unique sequence identifier is not added to the string dictionary.

10. The one or more computer-readable media according to claim 9, wherein the object comprises a plurality of entries for which unique self-distinguishable identifiers are generated.

11. The one or more computer-readable media according to claim 10, wherein the retrieving the entry and processing the retrieved entry comprises retrieving and processing the entries of the object in sequential order of entries in the object.

12. The one or more computer-readable media according to claim 9, wherein the sequence of fields of an entry are non-mandatory and one or more fields can be left empty.

13. The one or more computer-readable media according to claim 9, wherein only filled fields are concatenated.

14. The one or more computer-readable media according to claim 9, wherein the object comprises a table with a plurality of entries.

15. The one or more computer-readable media according to claim 14, wherein the fields are not mandatory and one or more fields of entries may be empty.

16. The one or more computer-readable media according to claim 9 further comprising entering entries into the object, wherein one or more fields of entries may be empty.

17. The one or more computer-readable media according to claim 16, wherein only filled fields are concatenated.

18. A system that facilities generating self-distinguishable identifiers, the system comprising:

a processor, the processor includes an input sub-system for receiving an object having entries, the object having an object structure which includes a sequence of fields for entries of the object, wherein an entry includes one or more filled fields, a memory sub-system, the memory sub-system includes a string dictionary containing dictionary entries of existing strings, and a processing sub-system for processing the object to generate unique self-distinguishable identifiers from the entries of the object, wherein processing the object comprises, analyzing each entry which includes, concatenating the filled fields of the object structure in sequence to create a concatenated identifier string of the entry being analyzed (analyzed entry), comparing the concatenated identifier string of the analyzed entry with the string dictionary, storing the concatenated identifier string of the analyzed entry in the string dictionary only if the concatenated identifier string is a unique concatenated string which does not match any dictionary entry in the string dictionary, and adding a unique sequence identifier to the concatenated string only if the concatenated identifier string is a non-unique concatenated string by matching a dictionary entry, wherein concatenated string with the unique sequence identifier is not added to the string dictionary.

19. The system according to claim 18, wherein the fields of an entry are not mandatory.

20. The system according to claim 18, wherein only filled fields are concatenated.

* * * * *